(12) United States Patent
Ertl

(10) Patent No.: US 8,348,634 B2
(45) Date of Patent: Jan. 8, 2013

(54) DEVICE FOR THE PROCESSING OF COMPRESSED AIR, AND METHOD FOR THE OPERATION THEREOF

(75) Inventor: Thomas Ertl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 589 days.

(21) Appl. No.: 12/095,661

(22) PCT Filed: Nov. 17, 2006

(86) PCT No.: PCT/EP2006/011031
§ 371 (c)(1),
(2), (4) Date: Apr. 15, 2010

(87) PCT Pub. No.: WO2007/062750
PCT Pub. Date: Jun. 7, 2007

(65) Prior Publication Data
US 2010/0186827 A1     Jul. 29, 2010

(30) Foreign Application Priority Data
Nov. 30, 2005 (DE) .................. 10 2005 057 004

(51) Int. Cl.
F04B 49/06 (2006.01)
B60T 7/00 (2006.01)
B60T 8/36 (2006.01)

(52) U.S. Cl. ......... 417/304; 303/15; 303/17; 303/119.1; 137/239

(58) Field of Classification Search .......... 417/302–304, 417/313; 137/239, 599.14; 303/15, 17, 118.1, 303/119.2
See application file for complete search history.

(56) References Cited

U.S. PATENT DOCUMENTS

| 6,089,831 A * | 7/2000 | Bruehmann et al. .......... 417/282 |
| 6,540,308 B1 * | 4/2003 | Hilberer ....................... 303/6.01 |
| 7,802,425 B2 * | 9/2010 | Fries et al. ...................... 60/329 |
| 2004/0026993 A1 | 2/2004 | Bates |
| 2005/0017474 A1 | 1/2005 | Heer |

FOREIGN PATENT DOCUMENTS

| DE | 196 20 851 C2 | 12/1997 |
| DE | 198 35 638 A1 | 2/2000 |
| DE | 103 57 762 A1 | 2/2005 |
| DE | 10 2004 026 624 B3 | 6/2005 |
| EP | 1 502 778 A1 | 2/2005 |
| EP | 1 527 974 A2 | 5/2005 |
| WO | WO 02/24506 A1 | 3/2002 |

OTHER PUBLICATIONS

International Search Report dated Apr. 4, 2007 with English translation (Four (4) Pages).
Form PCT/IB/373 and Form PCT/ISA/237 w/English translation (ten (10) pages), Jun. 3, 2008.

* cited by examiner

*Primary Examiner* — Charles Freay
(74) *Attorney, Agent, or Firm* — Crowell & Moring LLP

(57) ABSTRACT

A device for processing compressed air for a commercial vehicle is provided. The device includes an inlet connection for connecting a compressor, an air dryer unit, a first solenoid valve for pneumatically shutting off the compressor and blocking a pipe that is connected to the compressor, and a second solenoid valve for controlling a backflow of air to regenerate the air filter unit. Loss of compressed air during regeneration in the pressure in a pipe located between the compressor and a stop valve upstream of the air filter unit is minimized by exciting the first solenoid valve. Different methods for operating the compressed air processing device are also provided.

9 Claims, 8 Drawing Sheets

DEVICE FOR THE PROCESSING OF COMPRESSED AIR, AND METHOD FOR THE OPERATION THEREOF

CROSS-REFERENCE TO RELATED APPLICATIONS

This application is a U.S. National Phase of PCT International Application No. PCT/EP2006/011031, filed on Nov. 17, 2006, which claims priority under 35 U.S.C. §119 to German Application No. 10 2005 057 004.6, filed Nov. 30, 2005, the entire disclosures of which are expressly incorporated by reference herein.

BACKGROUND AND SUMMARY OF THE INVENTION

The invention relates to a device for the processing of compressed air for a commercial vehicle, with an inlet connection for connecting a compressor, a ventilation (also referred to as a vent), a compressor control outlet for acting with pressure upon a control inlet of the compressor, an air dryer unit, a pneumatically activatable shut-off valve which follows the inlet connection in the flow direction and which can be transferred from an open to a closed state by the action of pressure, a pneumatically activatable pressure regulating valve which is arranged between an outlet connection of the shut-off valve and the ventilation and which can be transferred from a closed to an open state by the action of pressure, a compressor control device which has a first solenoid valve and via which, in an excited state of the first solenoid valve, compressed air can be supplied to a control inlet of the shut-off valve and to the compressor control outlet, and a second solenoid valve which, in the excited state, allows a backflow of compressed air through the air dryer unit and the pressure regulating valve to the ventilation and via which, in the excited state, a control inlet of the pressure regulating valve can be acted upon with compressed air.

The invention relates, furthermore, to various methods for operating such a device for the processing of compressed air.

Devices for the processing of compressed air contain as central components a pressure regulator, an air dryer unit and a multiple-circuit protection valve. In the electronic design of the device for the processing of compressed air, an electronic control is integrated as a further essential component into the device. Compressed air is supplied by a compressor to the device for the processing of compressed air, this compressed air supply being delivered via the air dryer unit and the multiple-circuit protection valve to various consumers of a commercial vehicle, for example to the brake system of the traction vehicle and trailer, to a lift-axle device and to other secondary consumers, as they are known. The multiple-circuit protection valve in this case serves particularly the purposes of controlling the filling sequence of the various consumer circuits and of protecting the various circuits with respect to one another or of topping them up in a suitable way. The pressure regulator is provided in order, when the maximum permissible system pressure is overshot, that is to say in the case of additional compressed air not required, to discharge the surplus compressed air via ventilation. The air dryer unit is provided in order to supply dried and purified air to the consumers and thereby to avoid premature wear of the consumers due to corrosion and comparable processes.

Since the air dryer unit is laden with moisture and other foreign particles during the operation of the device for the processing of compressed air, it is necessary to regenerate the latter from time to time, either at regular time intervals or when specific preconditions are present, for example a signal from a moisture sensor. The regeneration of the air processing plant then takes place in that air is extracted from the reservoirs previously filled with dry compressed air and flows through the air dryer unit in a direction which is opposite to the flow direction when the system is being filled. Since a flow in such a direction is undesirable outside the regeneration phases, this is prevented by a nonreturn valve which follows the air dryer unit. During the regeneration phases, this nonreturn valve is bypassed by the changeover of a solenoid valve.

There are various concepts for operating the compressor during the regeneration phases. For example, it is possible to allow the compressor to continue to convey during idling, that is to say to discharge via a ventilation line the air which is delivered by the compressor. Other concepts provide for switching off the compressor during the regeneration phase in order to save energy. To make this possible, the device for the processing of compressed air has provided on it a compressor control outlet, to which a control inlet of the compressor is connected. It is thereby possible to supply compressed air in a directed manner to the control inlet of the compressor in order to switch off the latter.

WO 02/24506 A1 describes such a concept, in which a switching off of the compressor takes place, with reference to several embodiments. According to one of these embodiments, there is provision, in addition to switching off the compressor, for closing a shut-off valve in the conveying line of the compressor, in order thereby to avoid an unnecessary pressure loss in the conveying line. When the compressor is restarted, a smaller volume consequently has to be brought anew to the desired pressure. However, according to this exemplary embodiment of WO 02/24506 A1, only a pressure breakdown downstream of the shut-off valve is prevented.

The object on which the invention is based is to make available a device for the processing of compressed air, having improved properties, while, in particular, an unnecessary pressure loss in the compressor line is to be avoided.

This object is achieved by means of the features of the independent claims. Advantageous embodiments of the invention are specified in the dependent claims.

The invention builds on the generic device for the processing of compressed air, in that, with the first solenoid valve excited, the pressure in a line between the compressor and the shut-off valve is essentially maintained. Consequently, when compressor operation resumes, the volume which is held under pressure does not have to be filled anew, thus giving rise to a saving of energy and of time.

This functionality may be implemented particularly in that the first solenoid valve, besides activating the shut-off valve and the control valve, does not assume any further control functions relating to the line between the compressor and the shut-off valve. Hence, besides acting with the pressure upon the compressor control inlet, the first solenoid valve merely activates the shut-off valve, and, in particular, there is no activation of a further valve, via which compressed air could escape from the compressor line. The pressure in the line region upstream of the shut-off valve is therefore maintained when the compressor is switched off.

It is preferable that the compressor control device has a control valve, that compressed air delivered by the first solenoid valve can be supplied to the compressor control outlet via the control valve, and that, in the absence of compressed air delivered by the first solenoid valve, the control valve connects the compressor control outlet to the ventilation. Since the compressor control device has a solenoid valve and a control valve, the aerating and exhausting ventilation of the control inlets involved can take place reliably and in a controlled way. In particular, although compressed air is supplied to the control inlet of the compressor by the control valve and is delivered directly by the solenoid valve, there is nevertheless no need for ventilation of the control inlet to take place via the solenoid valve, since the control valve can make available a direct connection of the compressor control outlet to the ventilation.

Furthermore, there may be provision for the shut-off valve to be able to be transferred into its open state by means of a spring force. The shut-off valve is therefore always opened, independently of the conveying pressure of the compressor, when the control inlet of the shut-off valve is not acted upon with compressed air. By such action of pressure upon the control inlet, the shut-off valve can then be closed counter to the spring force.

It is particularly expedient that a safety valve is provided which limits the pressure in the line between the compressor and the shut-off valve. Since the compressor conveying line is not ventilated upstream of the shut-off valve in the conveying intermission, it is expedient to provide a safety valve, in order thereby to prevent a pressure rise in said line branch. Such a safety valve may be provided inside the device for the processing of compressed air or else be implemented as an external component. As a particular embodiment, a shut-off valve with an integrated safety valve offers complete functionality in terms of maintaining the pressure and affords the required safety, while at the same time having a low outlay in terms of assembly and a small construction space requirement.

The invention relates, furthermore, to a method for operating a device for the processing of compressed air according to the invention, having the steps:

transfer of the first solenoid valve into an excited state,
transfer of the second solenoid valve into an excited state,
maintaining these states for the purpose of the regeneration of the air dryer unit, a pressure in a line between the compressor and the shut-off valve being essentially maintained,
transfer of the second solenoid valve into a non-excited state, and
transfer of the first solenoid valve into a non-excited state.

According to this method, the regeneration of the air dryer unit in the device for the processing of compressed air is implemented, while at the same time the pressure in the compressor conveying line is maintained.

Furthermore, however, the invention also makes available a method for operating a device for the processing of compressed air according to the invention, having the following steps:

transfer of the second solenoid valve into an excited state, and
maintaining a non-excited state of the first solenoid valve and the excited state of the second solenoid valve for the purpose of regenerating a line between the compressor and the device for the processing of compressed air.

Thus, moisture and dirt can be removed, as required, from the compressor conveying line, since, in the described switching states of the solenoid valves, the compressor continues to convey in the direction of ventilation.

The method may expediently be developed in that it is carried out at regular time intervals.

Alternatively or additionally, however, there may also be provision for the method to be carried out in the presence of one or more conditions. Such events may be given, for example, by the detection of specific measurement values of sensors, for example pressure and/or temperature sensors.

The invention, then, is explained by way of example by means of particularly preferred embodiments, with reference to the accompanying drawings in which:

BRIEF DESCRIPTION OF THE DRAWINGS

In the following description of the drawings, the same reference symbols designate identical or comparable components.

DETAILED DESCRIPTION

Figure 1:
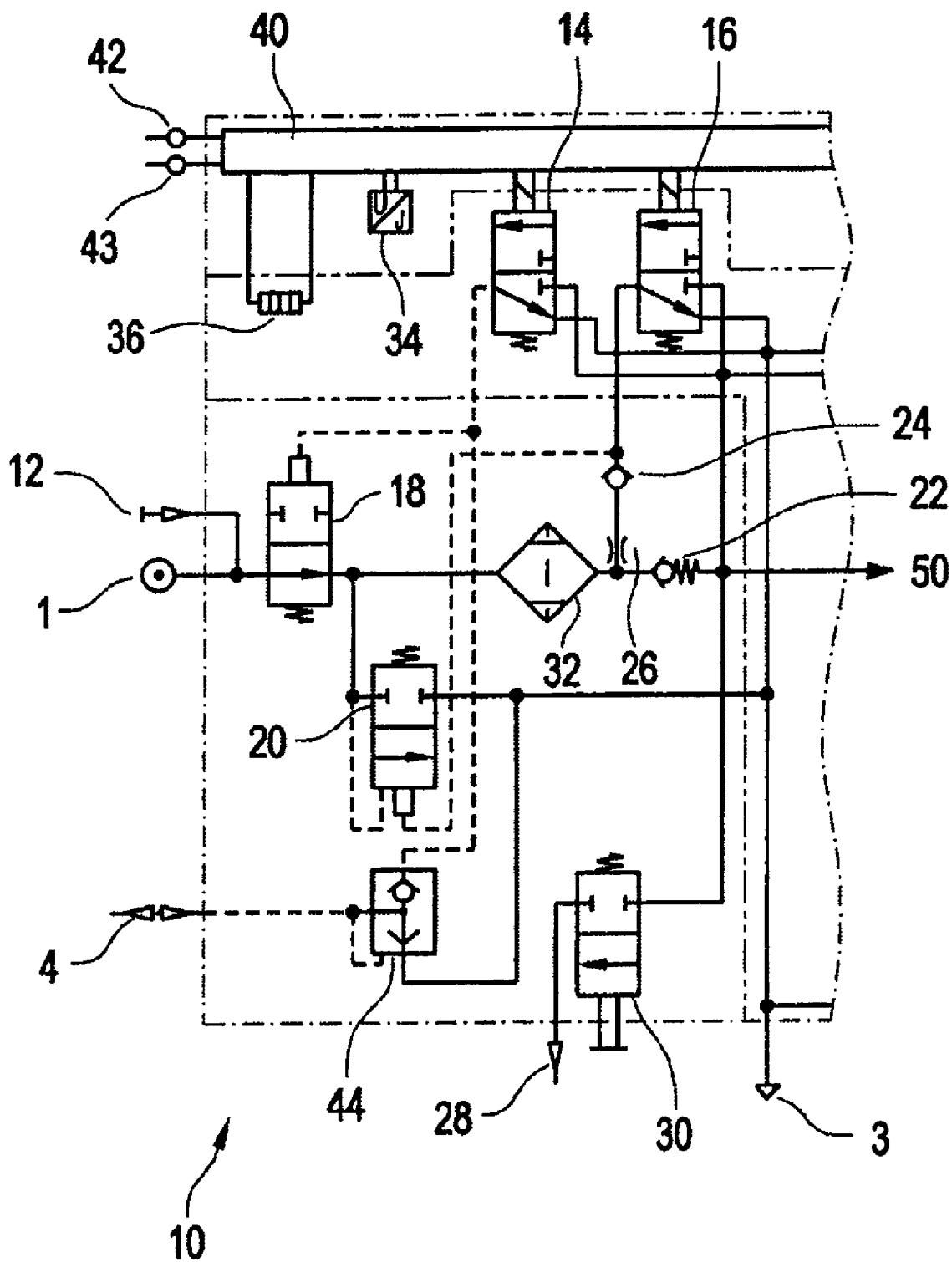
FIG. 1 shows a circuit diagram of part of a first embodiment of a device for the processing of compressed air according to the invention.

FIG. 1 shows a circuit diagram of part of a first embodiment of a device for the processing of compressed air according to the invention. The device for the processing of compressed air according to the invention 10 has a compressed air inlet 1 to which compressed air can be supplied from a compressor, not illustrated. Parallel to the compressed air inlet 1, an external filling connection 12 is provided, via which the compressed air system of the commercial vehicle can be filled, for example in a garage, without the compressor being operated. Furthermore, a ventilation 3 is present. Compressed air passes via the compressed air inlet 1 to an air dryer unit 32 and from there, by way of a nonreturn valve 22, via a multiple-circuit protection valve device, not illustrated, to compressed air consumers 50, not illustrated. The nonreturn valve 22 is provided for avoiding a backflow of compressed air from the consumers 50 in the direction of the air dryer unit 32. However, in order to allow a desirable backflow of dry compressed air from the reservoirs through the air dryer unit 32 for regeneration purposes, a solenoid valve 16 is provided, via which the nonreturn valve 22 can be bypassed in a corresponding switching state. The solenoid valve 16 is connected in series to a nonreturn valve 24 and a throttle 26. During the conveying phases of the compressor, the nonreturn valve 24 avoids an overflow of compressed air via the solenoid valve 16 to the ventilation 3. The throttle is provided for limiting the flow velocity in a way which is conducive to regeneration. Upstream of the nonreturn valve 24, a control line is connected, which leads to a pressure regulating valve 20. The pressure regulating valve 20 is connected between the inlet side of the air dryer unit 32 and the ventilation 3. A further solenoid valve 14 is provided. Via this further solenoid valve 14, a control inlet of a shut-off valve 18 can be acted upon with pressure, the shut-off valve 18 thereby being transferred into a closed position. However, via the solenoid valve 14, pressure is also supplied to a compressor control outlet 4 via a control valve 44. The control valve 44 is designed such that, in the absence of the action of pressure by means of the solenoid valve 14, it connects the compressor control outlet 4 to the ventilation 3, thereby making available rapid ventilation and therefore a reliable operation of the compressor in terms of the restarting of the latter. Further components of the device for the processing of compressed air 10 illustrated are an electronic control unit 40, via which the solenoid valves 14, 16 can be excited independently. Furthermore, a temperature sensor 34 and heating 36 are connected to the electronic control unit 40. The electronic control unit 40 has a central plug 42 as an interface with the other vehicle electronics. Moreover, an optional moisture plug 43 is provided, via which a signal from an external moisture sensor, not illustrated, can be read in. This is usually mounted at the lowest point of one of the service brake compressed-air reservoirs. The electronic control unit 40 can activate further components, not illustrated, in particular solenoid valves, and further sensors for monitoring, controlling and regulating the system may be provided, in particular moisture, temperature and pressure sensors. Furthermore, a tire filling valve 30 can be seen, which is connected between the line leading to the consumers 50 and a tire filling connection 28. The tire filling valve 30 can be actuated, as required, in order to extract compressed air via the tire filling connection 28.

The device for the processing of compressed air 10 illustrated operates as follows. During normal conveying operation, the compressor conveys compressed air into the compressed air inlet 1. The shut-off valve 18 is in its open position illustrated. Compressed air consequently passes through the air dryer unit 32 and via the nonreturn valve 22 and the multiple-circuit protection valve to the consumers 50. During this normal operation, the air dryer unit 32 is laden with moisture and foreign particles, for example compressor oil and its decomposition products. In order to cause a regeneration of the air dryer unit 32, the two solenoid valves 14 and 16 are transferred into their position, not illustrated, so that firstly, via the solenoid valve 16, the regeneration airflow can take place through the nonreturn valve 24, the throttle 26, the air dryer unit 32, the pressure regulating valve 20, likewise changed over on account of the changeover of the solenoid valve 16, and the ventilation 3. In order to avoid a pressure loss from the line connected to the compressor, when the compressor is switched off the shut-off valve 18 is also changed over via the control valve 44 by means of the changeover of the solenoid valve 14 and the action of pressure upon the compressor control outlet 4, so that said shut-off valve assumes its blocking position. To restart conveying operation after regeneration, the solenoid valves 14 and 16 are transferred into their illustrated positions again, so that the control inlets connected to them are ventilated, and in this case the ventilation of the control inlet of the compressor can take place directly without a bypass via a solenoid valve.

In addition to normal conveying operation and regeneration operation, the device for the processing of compressed air according to the invention 10 makes it possible to have a further operating mode in which moisture and impurities can be removed from the compressor line. This operating mode can be implemented in that the solenoid valve 16 is changed over, but the solenoid valve 14 remains in its position illustrated. Consequently, the compressor continues to convey, but with reduced load, in the direction of ventilation. The result of this is that moisture and dirt which has accumulated in the conveying line are expelled by means of the compressed air.

Figure 2:
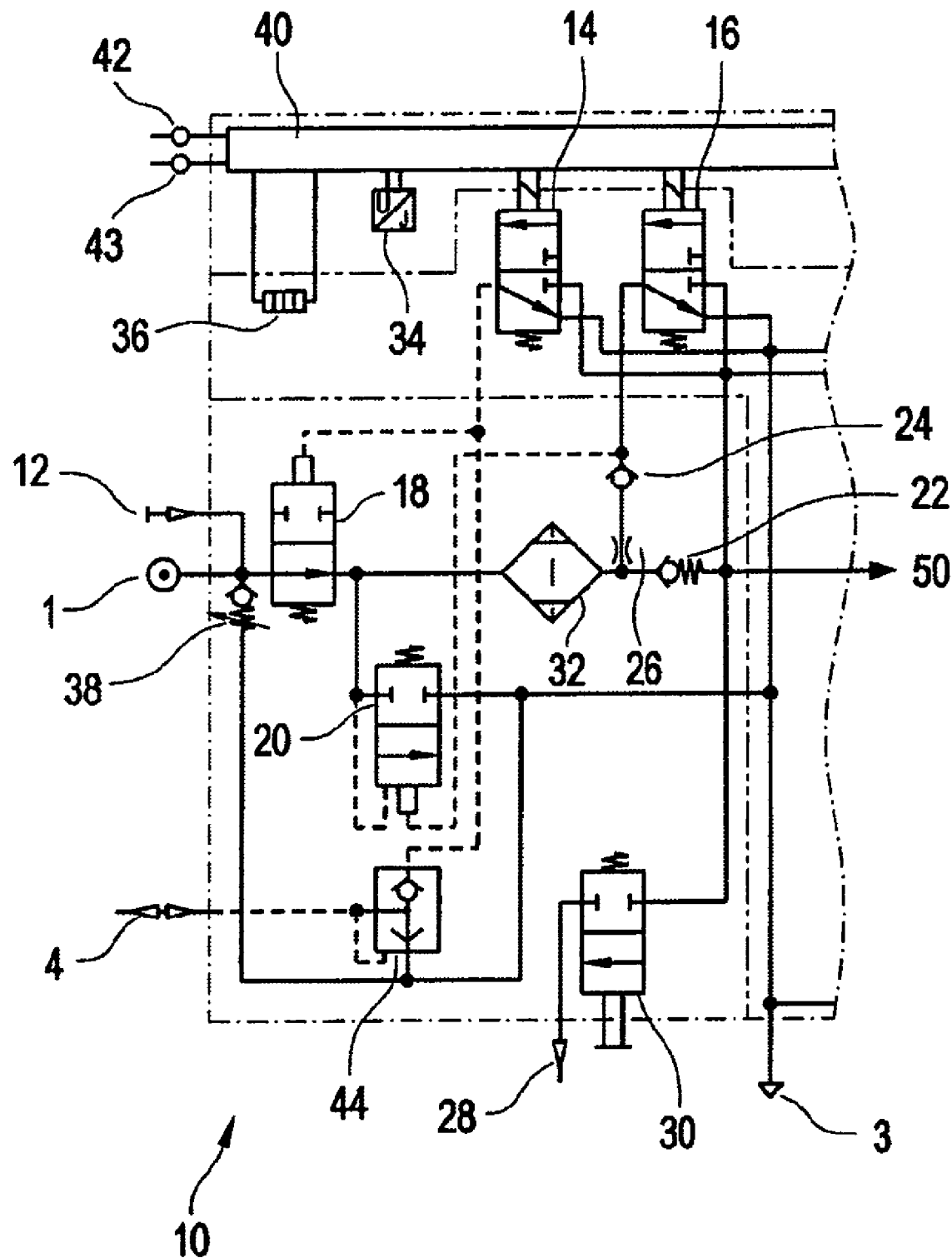
FIG. 2 shows a circuit diagram of part of a second embodiment of a device for the processing of compressed air according to the invention.

FIG. 2 shows a circuit diagram of part of a second embodiment of a device for the processing of compressed air according to the invention. The device for the processing of compressed air 10, illustrated here, has, in addition to the device illustrated in FIG. 1, a safety valve 38 which is connected between the compressed air inlet 1 and the ventilation 3. This safety valve 38 limits the pressure in the compressor conveying line, so that, in particular, further conveyance by the compressor after the shut-off valve 18 has been changed over does not lead to an undesirable excessive pressure rise. The safety valve 38 illustrated here is integrated into the device for the processing of compressed air 10.

Figure 3:
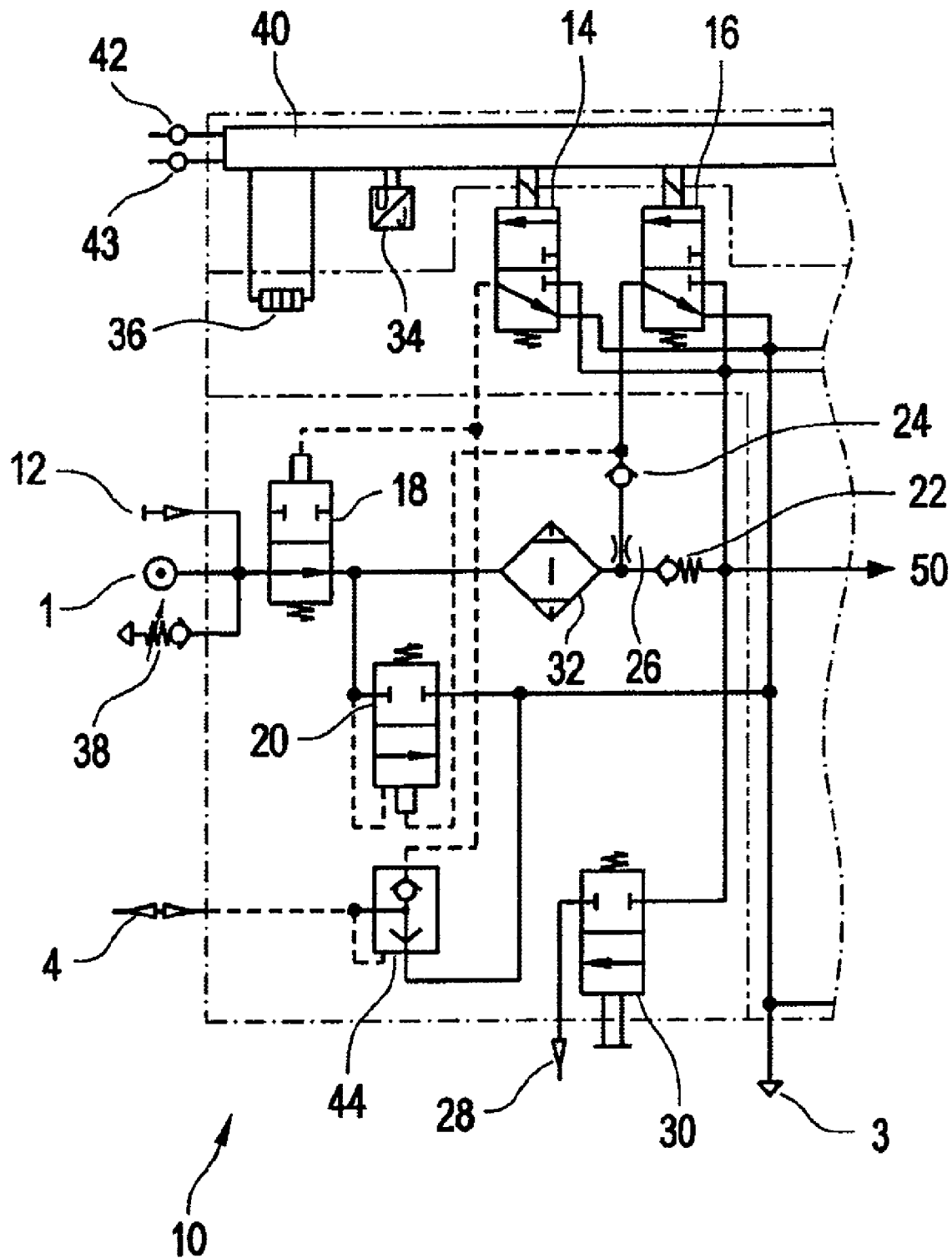
FIG. 3 shows a circuit diagram of part of a third embodiment of a device for the processing of compressed air according to the invention.

FIG. 3 shows a circuit diagram of part of a third and a fourth embodiment of a device for the processing of compressed air according to the invention. Here, too, a safety valve 38 for pressure limitation is provided, although this is arranged outside the device for the processing of compressed air 10.

Figure 4:
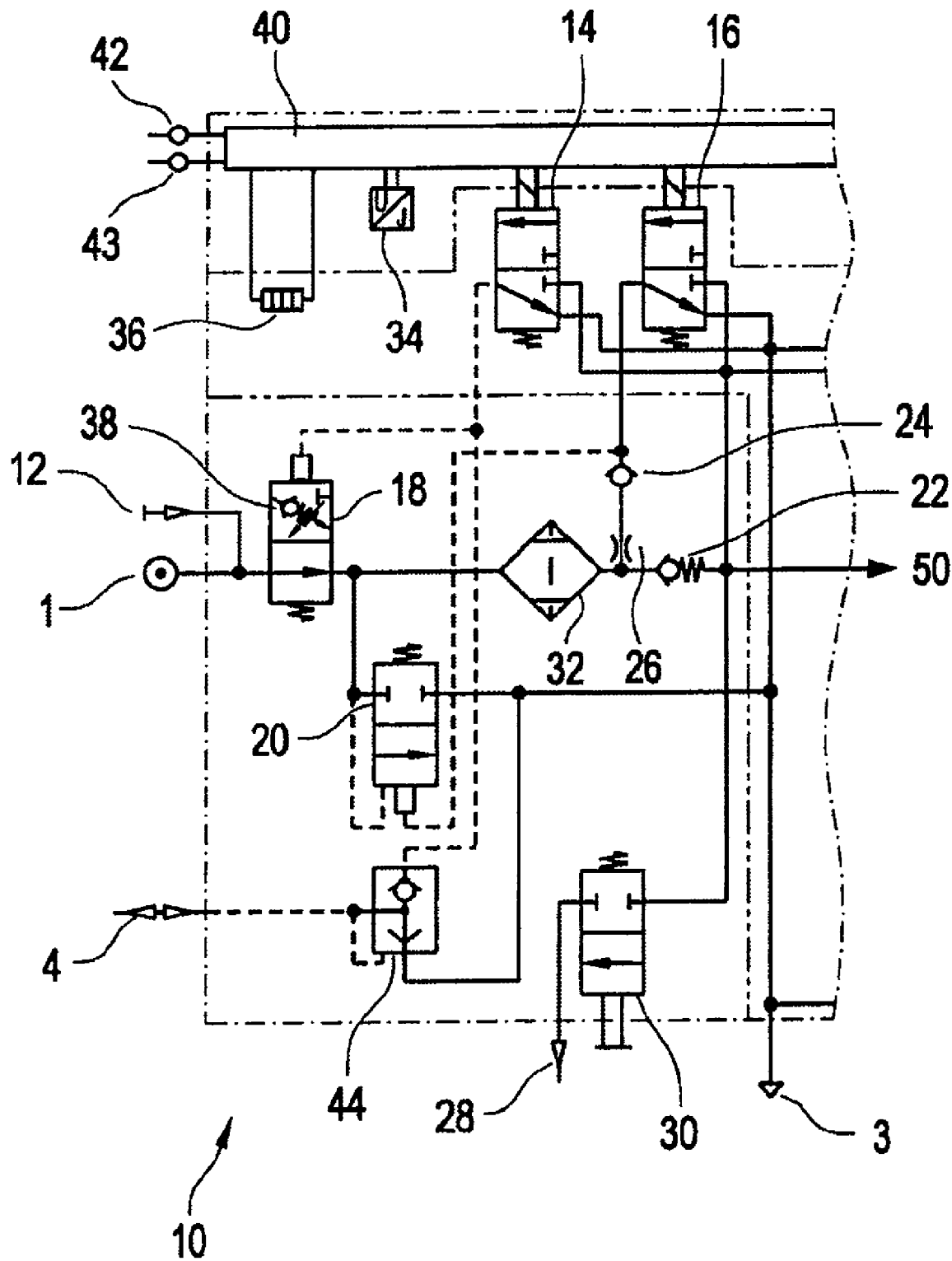
FIG. 4 shows a circuit diagram of part of a fourth embodiment of a device for the processing of compressed air according to the invention.

FIG. 4 shows a circuit diagram of part of a third and a fourth embodiment of a device for the processing of compressed air according to the invention. The embodiment illustrated here likewise has a safety valve 38. This is integrated into the shut-off valve 18. For this purpose, the shut-off valve 18 is equipped with a further connection, as compared with the shut-off valves illustrated in FIGS. 1 to 3.

Figure 5:
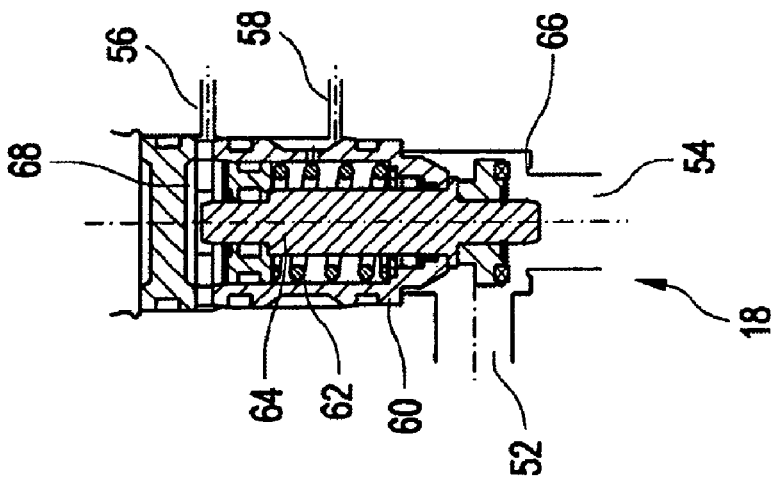
FIG. 5 shows a sectional view of a first embodiment of a shut-off valve.

FIG. 5 shows a sectional view of a first embodiment of a shut-off valve. The shut-off valve 18 has an inlet connection 52 and an outlet connection 54. The inlet connection 52 is connected to the compressor. The outlet connection 54 leads to the air dryer unit. Supported on a valve housing 60 is a spring 62 which drives a valve body 64 by means of the spring force in a direction releasing a valve seat 66. Furthermore, a control connection 56 and a secondary ventilation 58 are provided. The secondary ventilation is present so that no disturbing pressure directed counter to the switching pressure can build up in the spring space. By the action of pressure upon the control connection 56 and the build-up of pressure caused thereby in a control chamber 68, the spring 62 can be compressed until the valve seat 66 blocks the connection between the inlet connection 52 and the outlet connection 54.

Figure 6:
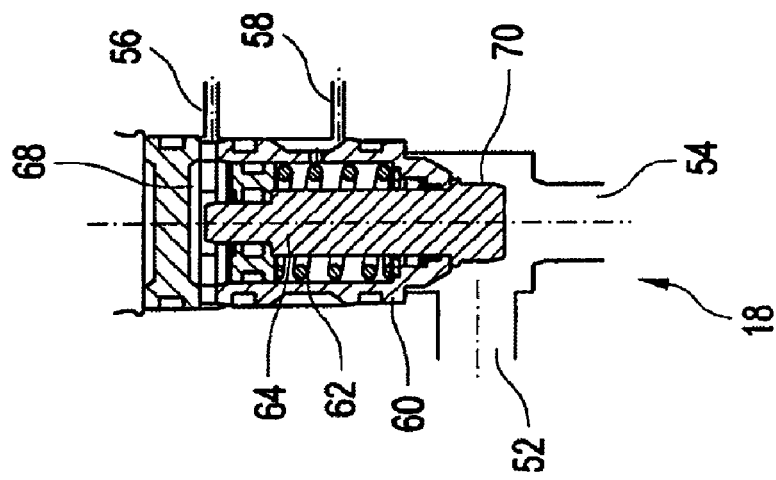
FIG. 6 shows a sectional view of a second embodiment of a shut-off valve.

FIG. 6 shows a sectional view of a second embodiment of a shut-off valve. The shut-off valve 18 is similar to the shut-off valve illustrated in FIG. 5, although it is not designed as a seat valve, but is equipped with a tappet 70.

Figure 7:
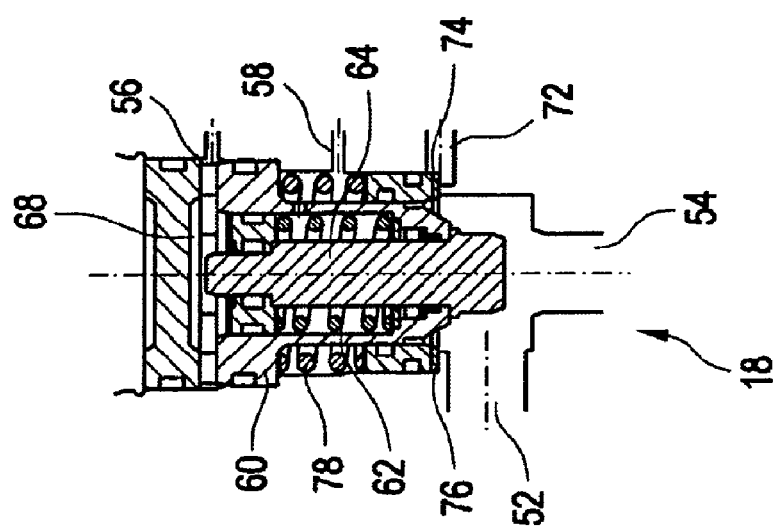
FIG. 7 shows a sectional view of a third embodiment of a shut-off valve with an integrated safety valve.

FIG. 7 shows a sectional view of a third embodiment of a shut-off valve with an integrated safety valve. The shut-off valve illustrated here is based on the shut-off valve according to FIG. 6. It has an additional outlet connection 72 which, together with a valve seat 74, a valve body 76 and a spring 78, forms a safety valve. When the shut-off valve 18 is closed by the action of pressure upon the control chamber 68, an excessive pressure at the inlet connection 52 can be broken down via the valve seat 74 and the outlet connection 72.

Figure 8:
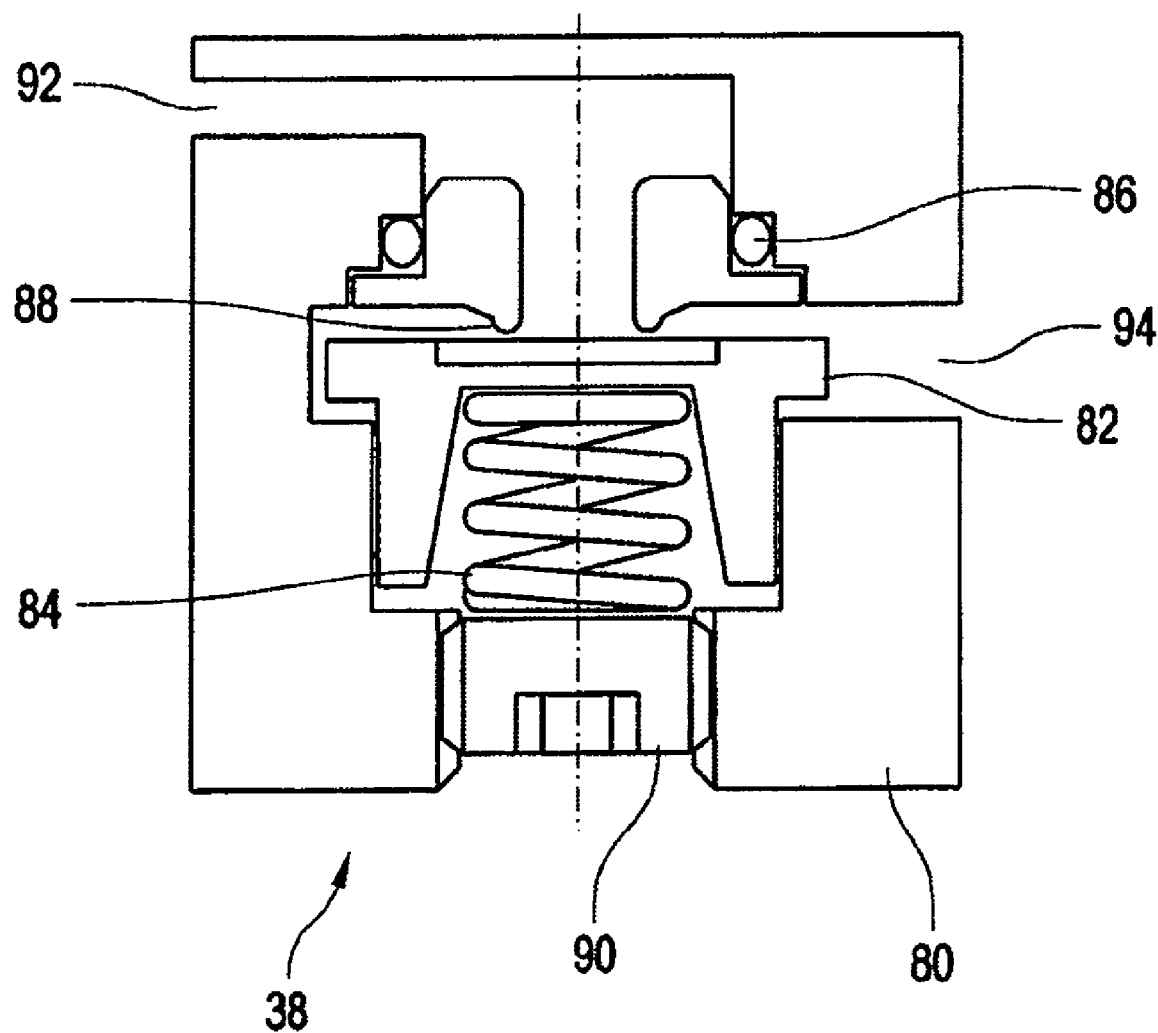
FIG. 8 shows a sectional view of a first embodiment of a safety valve.

FIG. 8 shows a sectional view of a first embodiment of a safety valve. The safety valve 38 has a valve housing 80 in which a valve body 82 is arranged. The valve body 82 is driven by a compression spring 84 in the direction of a valve seat 88 arranged via a seal 86 in the housing. The force exerted on the valve body 82 by the compression spring 84 can be set via a setscrew 90. When a pressure prevails at the inlet connection 92 so that the force exerted on the valve body 82 by the compression spring 84 is overshot, the pressure can be broken down via the valve seat 88 and the outlet connection 94.

Figure 9:
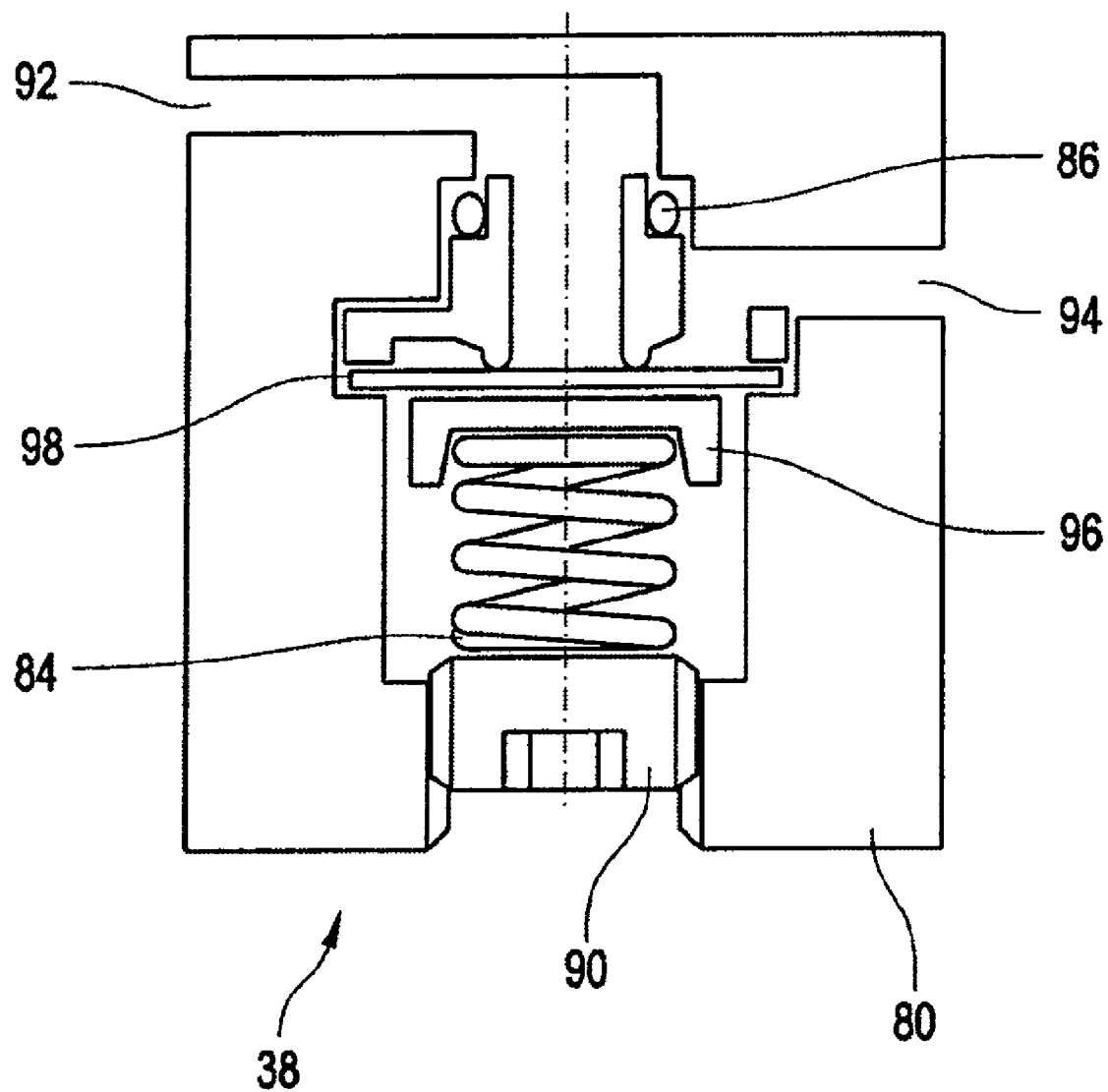
FIG. 9 shows a sectional view of a second embodiment of a safety valve.

FIG. 9 shows a sectional view of a second embodiment of a safety valve. The safety valve 38 illustrated here is constructed in a similar way to the safety valve illustrated in FIG. 8, although it is not designed with a valve body, but, instead, with a diaphragm 98 lying on a supporting plate 96. The diaphragm 98 is firmly connected on its circumference to the valve housing 80, and, because of its elasticity, it can block the valve seat 88 under the compression of the compression spring 84 or release said valve seat.

Figure 10:
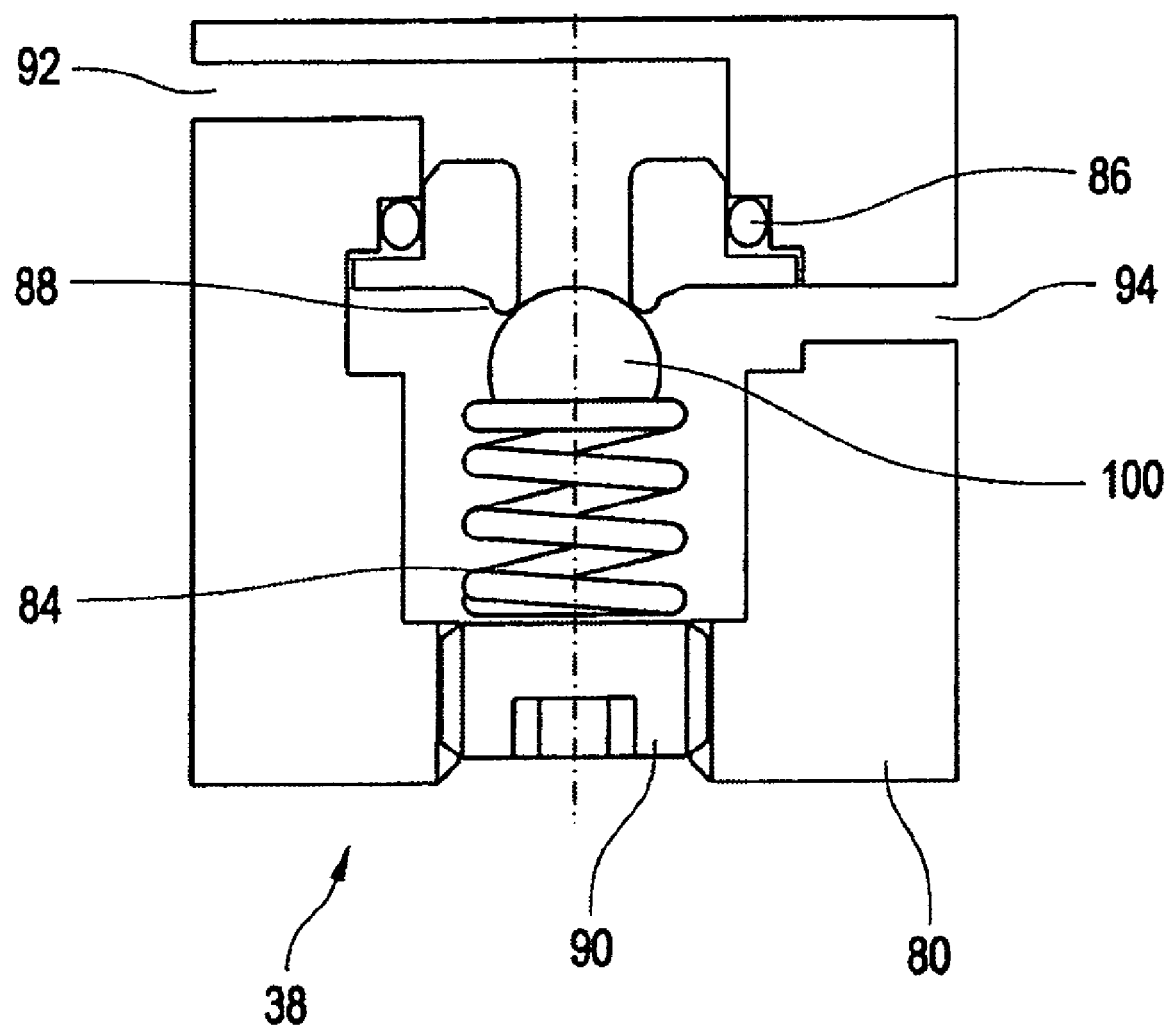
FIG. 10 shows a sectional view of a third embodiment of a safety valve.

FIG. 10 shows a sectional view of a third embodiment of a safety valve. The safety valve 18 illustrated here is designed as a ball valve. A ball 100 sits on a compression spring 84 supported on a setscrew 90 and is pressed onto a valve seat 74 by means of the compression spring 84. An excessive pressure at the inlet connection 92 can be broken down in that the force acting on the ball 100 by virtue of the pressure compresses the compression spring 84, with the result that the connection between the inlet connection 92 and the outlet connection 94 is released via the valve seat 88.

The features of the invention which are disclosed in the above description, in the drawings and in the claims may be essential both individually and in any desired combination for the implementation of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Compressed air inlet
3 Ventilation
4 Compressor control outlet
10 Device for the processing of compressed air
12 External filling connection
14 First solenoid valve
16 Second solenoid valve
18 Shut-off valve
20 Pressure regulating valve
22 Nonreturn valve
24 Nonreturn valve
26 Throttle
28 Tire filling connection
30 Tire filling valve
32 Air dryer unit
34 Temperature sensor
36 Heating
38 Safety valve
40 Electronic control unit
42 Central plug
43 Moisture plug
44 Control valve
50 Consumer
52 Inlet connection
54 Outlet connection
56 Control connection
58 Secondary ventilation
60 Valve housing
62 Spring
64 Valve body
66 Valve seat
68 Control chamber
70 Tappet
72 Outlet connection
74 Valve seat
76 Valve body
78 Spring
80 Valve housing
82 Valve body
84 Compression spring
86 Seal
88 Valve seat
90 Setscrew
92 Inlet connection
94 Outlet connection
96 Supporting plate
98 Diaphragm
100 Ball

What is claimed is:

1. A device for the processing of compressed air for a commercial vehicle, comprising:
   an inlet connection for connecting a compressor;
   a vent;
   a compressor control outlet, said control outlet configured to supply pressure to a control inlet of the compressor,
   a pneumatically activatable shut-off valve, said shut-off valve arranged downstream of the inlet connection in the flow direction and operable to be transferred between an open to a closed state by application of pneumatic pressure;
   an air dryer unit downstream of the shut-off valve;
   a pneumatically activatable pressure regulating valve arranged between an outlet connection of the shut-off valve and the vent and operable to be transferred between a closed to an open state by application of pneumatic pressure; and
   a compressor control device, said control device having
      a first solenoid valve configured such that when in an excited state, the first solenoid valve supplies compressed air to a control inlet of the shut-off valve to transfer the shut-off valve to the closed state and supplies compressed air to the compressor control outlet to close a line between the compressor control outlet and the vent, thereby ensuring a pressure in a line between the compressor and the shut-off valve is essentially maintained, and
      a second solenoid valve configured such that when in an excited state, the second solenoid valve allows a backflow of compressed air through the air dryer unit and the pressure regulating valve to the vent, and allows a control inlet of the pressure regulating valve to be acted upon with compressed air.

2. The device for the processing of compressed air as claimed in claim 1, wherein the first solenoid valve, apart from supplying compressed air to the control inlet of the shut-off valve and the compressor control outlet, does not perform any other control functions associated with the line between the compressor and the shut-off valve.

3. The device for the processing of compressed air as claimed in claim 2, wherein
   the compressor control device includes a control valve,
   the control valve is arranged to supply compressed air from the first solenoid valve to the compressor control outlet, and
   in the absence of compressed air supplied by the first solenoid valve, the control valve connects the compressor control outlet to the vent.

4. The device for the processing of compressed air as claimed in claim 3, wherein the shut-off valve is biased toward the open state by a spring force.

5. The device for the processing of compressed air as claimed in claim 4, further comprising:

a safety valve, wherein said safety valve limits the pressure in the line between the compressor and the shut-off valve.

6. A method for operating a device for the processing of compressed air as claimed in claim 1, comprising the acts of:
transferring the first solenoid valve into an excited state;
transferring the second solenoid valve into an excited state;
maintaining the first and second solenoid valves in excited states for a period sufficient to regenerate the air dryer unit, while maintaining a pressure in the line between the compressor and the shut-off valve; and
upon completion of regeneration of the air dryer unit, transferring the second solenoid valve into a non-excited state and transferring the first solenoid valve into a non-excited state.

7. A method for operating a device for the processing of compressed air as claimed in claim 1, comprising the acts of:
transferring the second solenoid valve into an excited state; and
maintaining the first solenoid valve in a non-excited state for a period sufficient to regenerate a line between the compressor and the device for the processing of compressed air.

8. The method as claimed in claim 7, wherein the transferring and maintaining acts are performed at regular time intervals.

9. The method as claimed in claim 7, wherein the transferring and maintaining acts are performed in the presence of one or more predetermined conditions.

* * * * *